(12) United States Patent
Haines

(10) Patent No.: US 7,314,256 B1
(45) Date of Patent: Jan. 1, 2008

(54) WHEEL BEARING DUST CAP FOR RACING CARS

(75) Inventor: James S. Haines, Lancaster, PA (US)

(73) Assignee: Diversified Machine, Inc., Lancaster, PA (US)

( * ) Notice: Subject to any disclaimer, the term of this patent is extended or adjusted under 35 U.S.C. 154(b) by 145 days.

(21) Appl. No.: 11/256,867

(22) Filed: Oct. 24, 2005

(51) Int. Cl.
*B60B 27/00* (2006.01)

(52) U.S. Cl. .................................. 301/108.5

(58) Field of Classification Search ............. 301/108.1, 301/108.2, 108.3, 108.4, 108.5; 277/628, 277/630, 634, 635
See application file for complete search history.

(56) References Cited

U.S. PATENT DOCUMENTS

| 3,089,738 A | * | 5/1963 | Steiner ....................... 384/473 |
| 3,170,733 A | | 2/1965 | Lamme ....................... 301/37 |
| 3,598,450 A | * | 8/1971 | Brown et al. ............. 301/108.3 |
| 4,489,988 A | * | 12/1984 | Robbins .................. 301/108.4 |
| 5,464,277 A | | 11/1995 | Redd ........................ 301/108.4 |
| 6,203,204 B1 | | 3/2001 | Carmichael .................. 384/448 |
| 6,758,531 B1 | * | 7/2004 | Bullard ..................... 301/37.21 |
| 6,983,999 B2 | * | 1/2006 | Goettker .................. 301/108.4 |
| 7,125,084 B2 | * | 10/2006 | Dombrowski et al. ... 301/108.1 |
| 7,185,955 B2 | * | 3/2007 | Dombroski ............. 301/108.1 |

* cited by examiner

*Primary Examiner*—Jason R. Bellinger
*Assistant Examiner*—Kip Kotter
(74) *Attorney, Agent, or Firm*—Miller Law Group, PLLC

(57) ABSTRACT

A dust cap is mounting on the front wheel of a racing car to prevent contamination of the corresponding wheel bearings. The dust cap is threaded for engagement with corresponding threads formed on the wheel hub to allow the dust cap to be quickly removed or installed. An O-ring housed in a groove formed in the wheel hub engages the outer circumference of the dust cap to affect a seal between the dust cap and the wheel, and to restrict rotational movement of the dust cap and prevent an unintentional disengagement of the dust cap from the wheel. The closed end of the dust cap is formed with hexagonal flats having a spacing that fit the wrench used for engagement of the nut holding the wheel on the axle spindle, thus reducing the time needed for removal of the front wheel, particularly during pit stops in a car race.

14 Claims, 6 Drawing Sheets

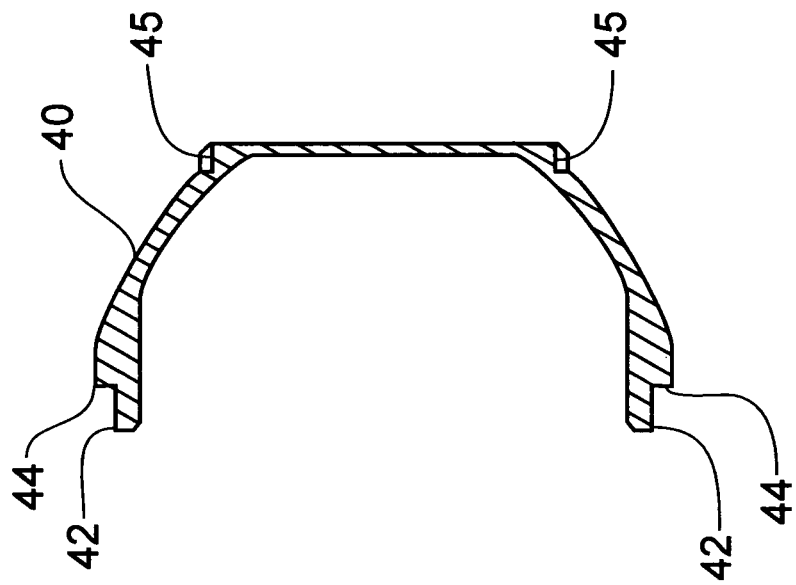
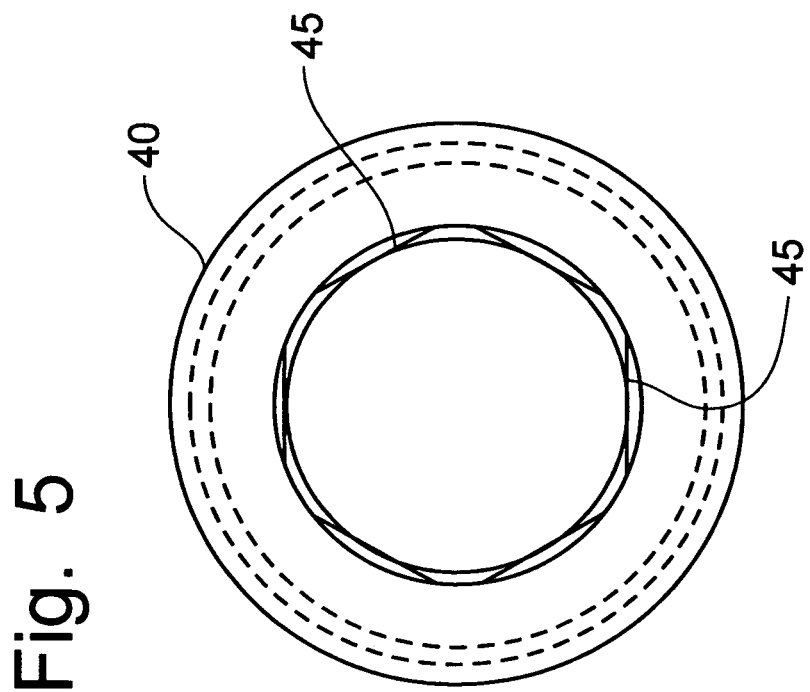

WHEEL BEARING DUST CAP FOR RACING CARS

BACKGROUND OF THE INVENTION

The present invention relates generally to a dust cap for protecting a wheel bearing from contamination, and, more particularly, to a dust cap that can be quickly removed to facilitate servicing of the wheel on race cars during a pit stop.

Sprint cars and smaller racing cars are provided with front, non-driven ground engaging wheels that are mounted by bearings on a spindle to permit rotation of the front tires with a minimum of friction to enhance the performance of the race car. The wheel is formed with a central opening that permits access to the spindle and the bearings mounting the wheel on the spindle, allowing the front wheel to be removed rapidly and replaced during a pit stop while the race is being conducted. This central opening is covered by a dust cap that is typically clipped to the wheel or to the wheel hub or fastened with pins, bolts or other fasteners. As a result, the dust cap requires a significant amount of time to remove before access to the spindle or bearings.

U.S. Pat. No. 3,170,733, granted to Robert Lamme on Feb. 23, 1965 discloses a wheel cover with an adapter held onto the wheel by the wheel lug nuts. The ornamental wheel cover includes a center cylinder with outside threads that screw onto inside threads on the center cylinder of the adapter. In U.S. Pat. No. 5,464,277, issued to Kevin Redd on Nov. 7, 1995, describes a bolt-on adapter for a decorative wheel ornament. The adapter is held onto the wheel by bolts, while the ornament has a cylindrical center with inside threads that match outside threads on the center cylinder of the adapter. U.S. Pat. No. 6,203,204, granted to Robert Carmichael on Mar. 10, 2001, uses a wheel bearing cap to hold a sensor detecting rotational movement of the wheel. An annular retaining ring on the wheel bearing cap is described only as being sealed into the annular groove in the wheel bearing outer ring as a support flange on the wheel bearing cap engages a mounting surface on the bearing outer ring.

None of these prior art references teach a wheel bearing cap that is operable to seal the central opening of the wheel in which the bearings are mounted against the entry of dirt and water, while providing an ability to remove the dust cap quickly to reduce the time of the pit stop for a race car requiring a front wheel change. The dust cap needs to prevent the entry of dirt into the wheel bearings to permit the bearings to function properly in rotatably mounting the front wheel to the front axle of the race car. However, a quick removal of the dust cap to gain access to the axle spindle and permit the quick removal of the front wheel to reduce the time the race car is in the pit being serviced is an important feature for race cars.

Some dust caps are press fit into the wheel or mounted with spring clips or spiral locks that require tools to affect the release of the dust cap from the wheel. If any difficulty is encountered in the removal of the dust cap, typically the dust cap is forcibly removed, resulting in an imperfect seal between the dust cap and the wheel when the dust cap is replaced on the wheel that has been newly mounted on the race car. In such situations, dirt is free to enter into the front wheel bearings to cause an increase in friction between the wheel and the axle spindle to the possible point of destruction of the front wheel bearings, which would eliminate the race car from the race being conducted.

The existing mounting of dust caps for the wheel bearings on racing cars does not provide a seal that prevents the introduction of water and/or dirt into the wheel bearings. Accordingly, the lubricant of choice that is used to lubricate the bearings is grease, which is a less effective lubricant than a more viscous oil lubricant.

Accordingly, it would be desirable to provide a dust cap that would provide an easily removable feature without damage to the dust cap, while maintaining a watertight and dirt tight seal between the dust cap and the wheel of the racing car.

SUMMARY OF THE INVENTION

It is an object of this invention to provide a dust cap for use on race cars that will seal the wheel bearings and provide the ability for a rapid removal of the dust cap.

It is a feature of this invention that the dust cap is threaded into the wheel hub to permit rapid installation and removal.

It is an advantage of this invention that the dust cap can be quickly removed for access to the wheel spindle.

It is another advantage of this invention that the rapidly removable dust cap can reduce time for a pit stop during a car race.

It is another feature of this invention that the dust cap cooperates with an O-ring to seal the central opening in the wheel against the dust cap.

It is still another advantage of this invention that the O-ring prevents the entry of dirt and moisture into the wheel bearings.

It is still another advantage of this invention that the O-ring engages the dust cap to restrict rotational movement of the dust cap so as to prevent an unintentional disengagement of the dust cap from the wheel mounting.

It is still another feature of this invention that the fixation of the dust cap to the wheel does not require extraneous fasteners or fastening clips.

It is yet another feature of this invention that the dust cap is formed with a hexagonal flats arranged around the closed end at the top of the dust cap to allow engagement thereof with a wrench for expediting the removal of the dust cap from the wheel mounting.

It is yet another advantage of this invention that the spacing of the hexagonal flats on the dust cap cooperates with the same size of wrench as is required for the removal of the nut holding the wheel onto the axle spindle.

It is a further advantage of this invention that the wrench used to remove the dust cap from the wheel mounting can then be used to remove the nut holding the wheel onto the axle spindle to further reduce the time required to remove a front wheel from a racing car.

It is a further feature of this invention that the watertight seal provided by the O-ring being compressed by the dust cap against the wheel hub allows the utilization of an oil lubricant to minimize friction within the wheel bearings.

It is still a further advantage of this invention that the dust cap provides the ability to use oil as a lubricant for the wheel bearings to reduce friction between the wheel and the axle spindle on which the wheel is rotatably mounted.

It is still another object of this invention to provide dust cap for use on the front wheel of a racing car to seal the wheel bearings from contamination of dirt and moisture while allowing for a rapid removal of the dust cap to access the wheel spindle, which is durable in construction, inexpensive of manufacture, carefree of maintenance, facile in assemblage, and simple and effective in use.

These and other objects, features and advantages are accomplished according to the instant invention by providing a dust cap for mounting on the front wheel of a racing car to prevent contamination of the corresponding wheel bearings wherein the dust cap is threaded for engagement with corresponding threads formed on the wheel hub to allow the dust cap to be quickly removed or installed. An O-ring housed in a groove formed in the wheel hub engages the outer circumference of the dust cap to affect a seal between the dust cap and the wheel, and to restrict rotational movement of the dust cap and prevent an unintentional disengagement of the dust cap from the wheel. The closed end of the dust cap is formed with hexagonal flats having a spacing that fit the wrench used for engagement of the nut holding the wheel on the axle spindle, thus reducing the time needed for removal of the front wheel, particularly during pit stops in a car race.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is an end elevational view of the dust cap;

FIG. 6 is a cross-sectional view of the dust cap corresponding to lines 6-6 of FIG. 5;

DETAILED DESCRIPTION OF THE PREFERRED EMBODIMENT

Figure 1:
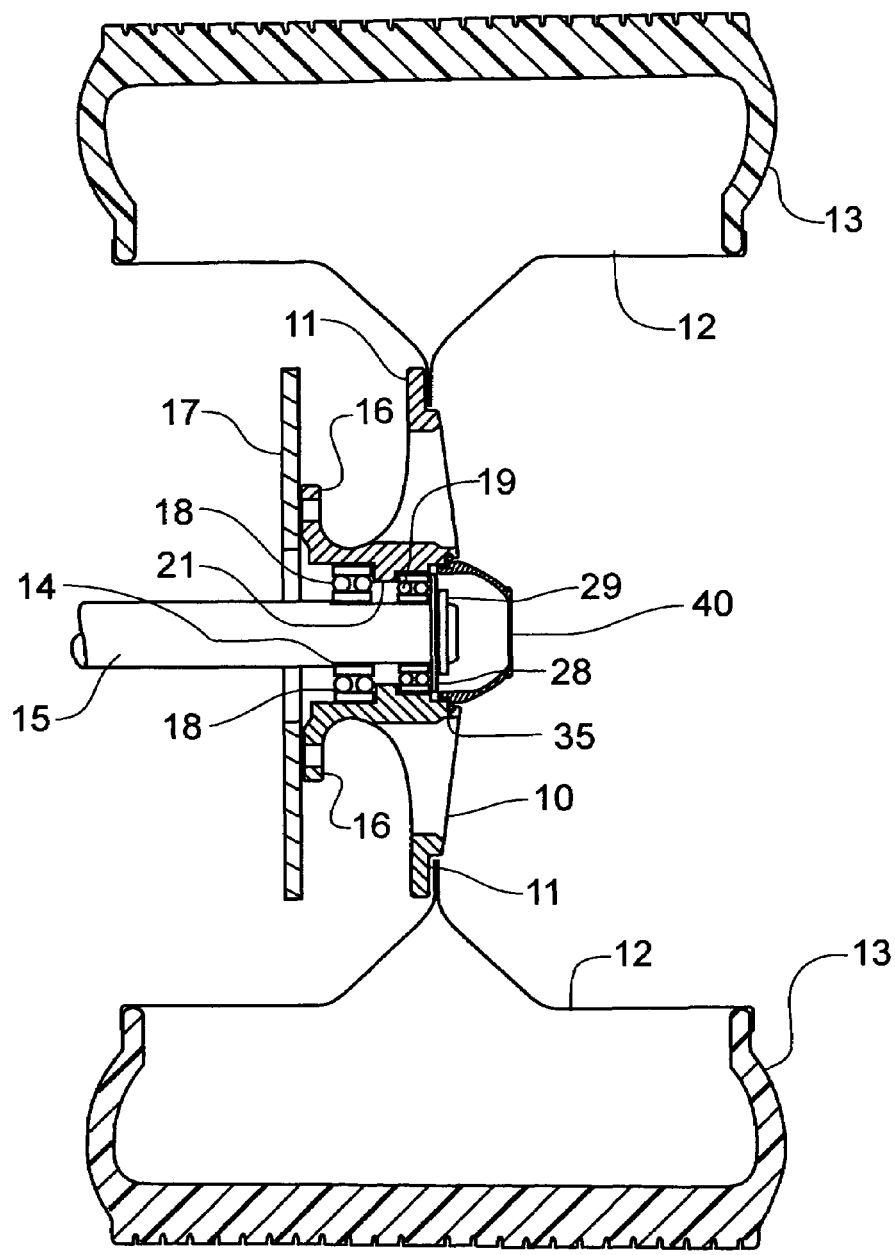
FIG. 1 is a cross-sectional view of a racing car wheel incorporating the principles of the instant invention, the wheel is shown with a rim and tire mounted thereon, the bearings are schematically depicted between the wheel and the axle spindle.
Figure 2:
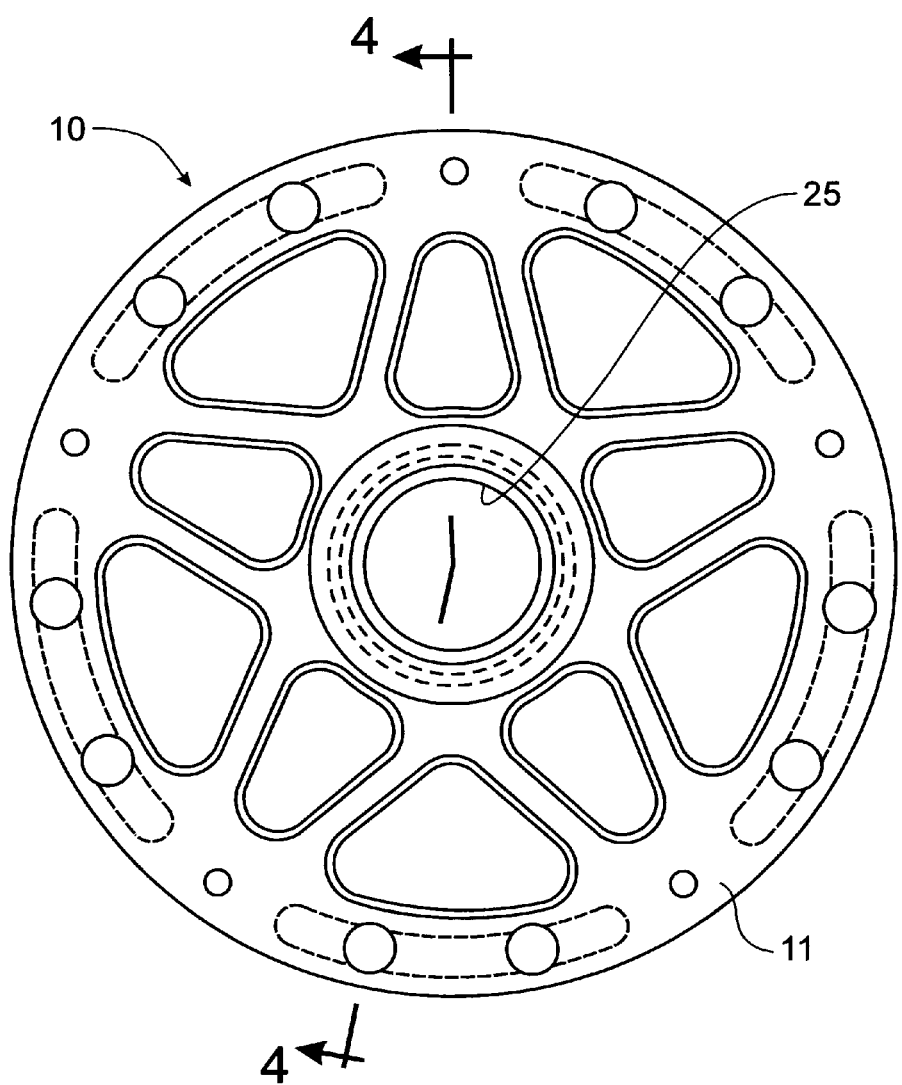
FIG. 2 is a front elevational view of the wheel having the dust cap removed for purposes of clarity.
Figure 3:
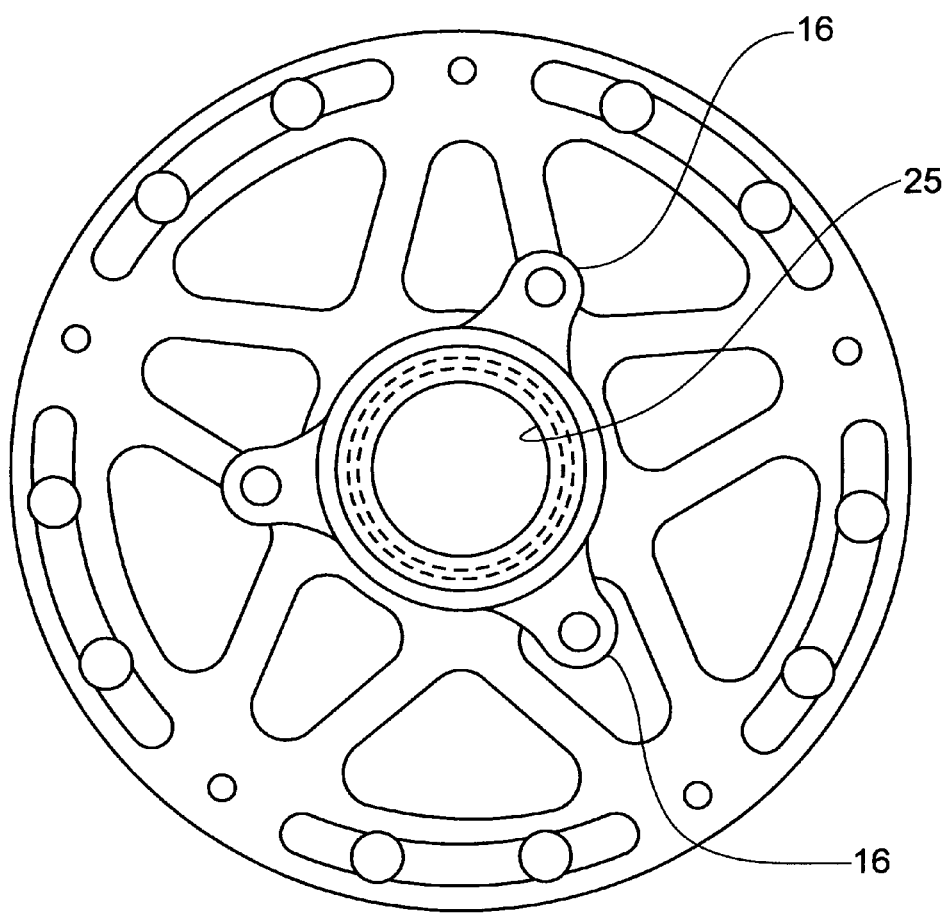
FIG. 3 is a rear elevational view of the wheel depicted in FIG. 2.
Figure 4:
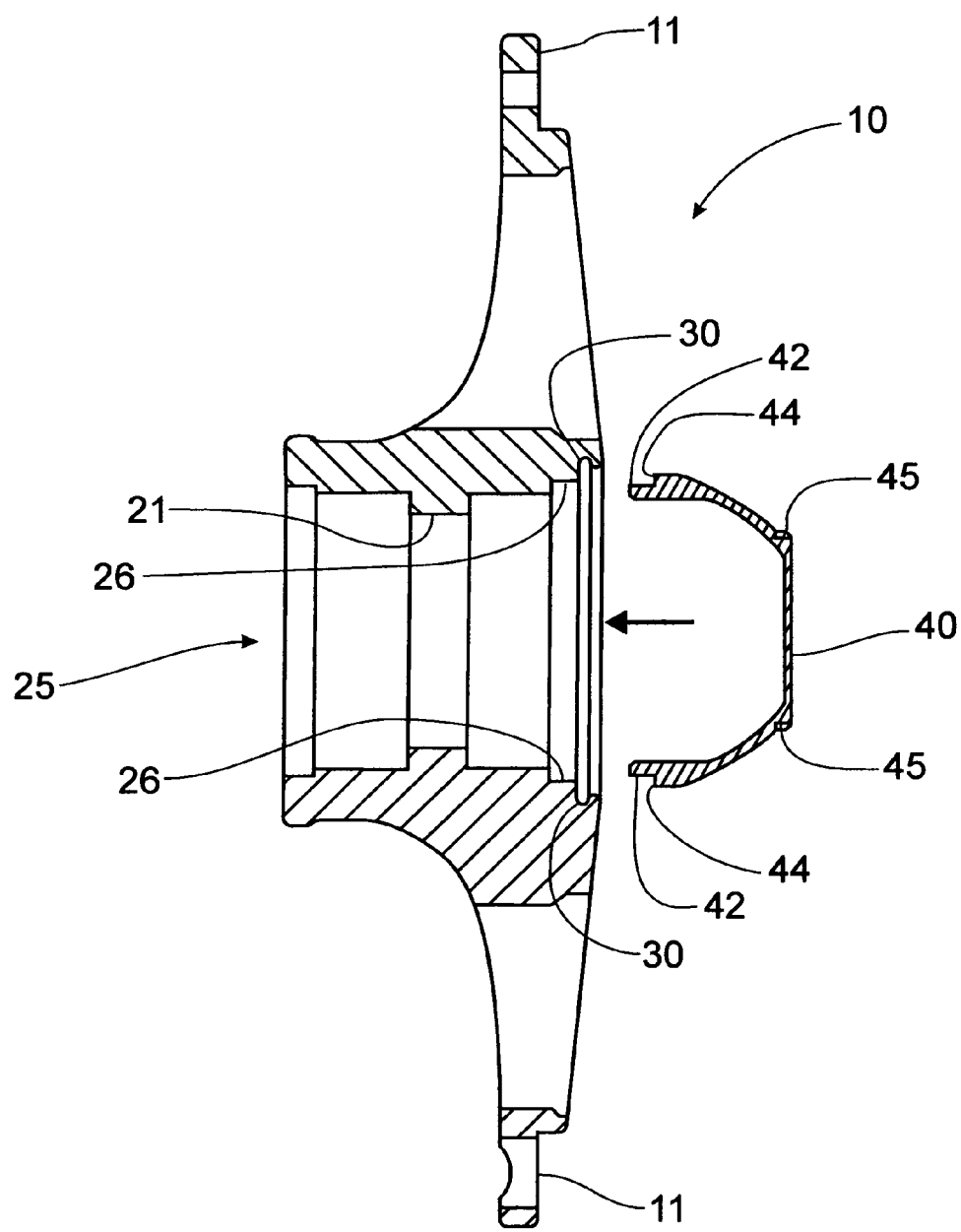
FIG. 4 is an enlarged cross-sectional view of the wheel corresponding to lines 4-4 of FIG. 2.

Referring now to the drawings, a front wheel for a sprint racing car incorporating the principles of the instant invention can best be seen. The wheel 10 is formed with an annular mounting flange 11 on which a rim 12 can be affixed for the mounting of a racing tire 13. The central wheel 10 is rotatably mounted on an axle spindle 15 by interior and exterior wheel bearings 18, 19. The wheel 10 is preferably formed with rearward mounting lugs 16 for the detachable mounting of a brake rotor 17 cooperable with known braking apparatus (not shown). Preferably, the spindle 15 is part of a front axle (not shown) on a racing car (not shown); however, the principles of the instant invention are not limited to front wheel assemblies.

One of ordinary skill in the art will recognize that the bearings 18, 19 could be ball bearings, as are schematically depicted in FIG. 1, roller bearings or other bearing configurations that are known in the art. The inner race of the bearings 18, 19 is preferably pressed onto the spindle shaft 15 which retains a bearing cage, while the outer race of the bearings are pressed into the wheel 10, as will be described in greater detail below. The interior bearing 18 is pressed against a shoulder 14 formed on the spindle 15 and is pressed against an internal shoulder 21 extending around the central bore 25 in the wheel 10. The exterior bearing 19 is located on the opposing side of the shoulder 14, and is trapped by a keeper 28 that engages the outer race of the exterior bearing 19 and is fixed against the exterior bearing 19 by a retainer nut 29 threaded onto the end of the spindle 15, which is formed with mating threads to received the retainer nut 29.

One skilled in the art will recognize that the nut 29 retains the wheel mounted on the bearings 18, 19 with the shoulder 21 trapped between the bearings 18, 19. While the race car is making a pit stop during a race, the wheel 10 can be quickly and easily removed by unthreading the retainer nut 29 from the spindle 15 and removing the keeper 28 to permit the wheel 10 to be pulled off of the spindle 15 along with the exterior bearing 19. Replacement of the wheel 10 can be accomplished easily by re-mounting the wheel 10 on the interior bearing 18 with the outer race thereof being pressed into the wheel 10 to locate the wheel 10 on the spindle 15. The exterior bearing 19 is then re-inserted between the outer race pressed into the wheel 10. Then, the keeper 28 and retainer nut 29 are threaded back onto the end of the spindle 15 and tightened to re-assemble the wheel 10 on the racing car.

As can best be seen in FIGS. 1, 4, 7 and 8, the bore 25 is formed with threads along a landing 26 extending around the interior surface of the bore 25 near the outer edge of the wheel 10. Externally of the landing 26, a groove 30 is formed around the circumference of the bore 25 at a position that is radially outward relative to the center of the bore 25 from the landing 26. An O-ring 35 is mounted within the groove 30 to engage the dust cap 40, as will be described in greater detail below.

Figure 7:
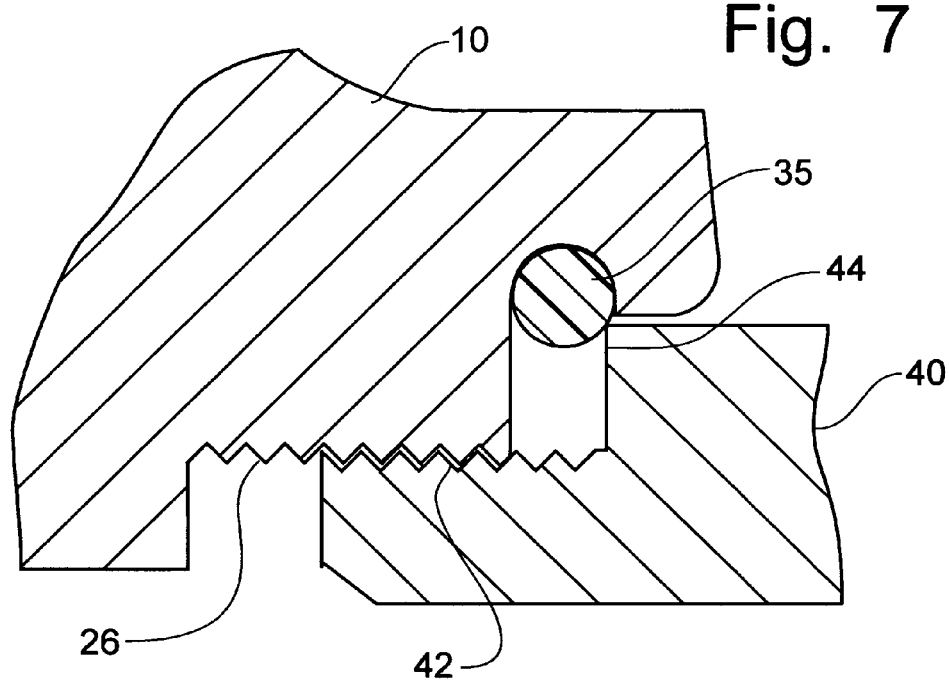
FIG. 7 is an enlarged cross-sectional view depicting the dust cap mounted of the wheel to the point of engagement with the O-ring mounted in the groove best seen in FIG. 4.

The dust cap 40 is best seen in FIGS. 1 and 4-8. The dust cap 40 is of generally conventional shape, formed in a cup-shaped configuration with a closed end and an open end that engages the wheel 10. The open end of the dust cap 40 is formed with a land 42 on which threads are formed to correspond to the threads on the landing 26 on the wheel 10. The land 42 has a reduced diameter as compared to the adjacent dust cap structure to form a shoulder 44 that is positioned to engage and compress the O-ring 35 when the dust cap 40 is fully threadably engaged with the wheel 10, as can be seen in FIGS. 1 and 7. Preferably, the partial threads on the dust cap 40 at the distal end of the dust cap 40 are milled off so that the initial point of contact with the threads on the dust cap 40 is a full thread thickness. The result is that the dust cap 40 can be quickly installed without fear of damaging the threads in a manner that would restrict the speed of installation of the dust cap 40.

The closed end of the dust cap 40 is formed with hexagonally formed flats 45 that can be engaged by a wrench or socket to facilitate the removal and installation of the dust cap 40 relative to the wheel 10. To expedite the removal of the dust cap 40 and the retainer nut 29 keeping the wheel 10 on the spindle 15, the spacing of the flats 45 on the closed end of the dust cap 40 requires the same size of wrench or socket as the retainer nut 29. Thus, during a pit stop, the wheel 10 can be removed quickly without changing wrenches or sockets.

The threading of the dust cap 40 onto the wheel 10 permits a quick installation and removal of the dust cap 10.

Figure 8:
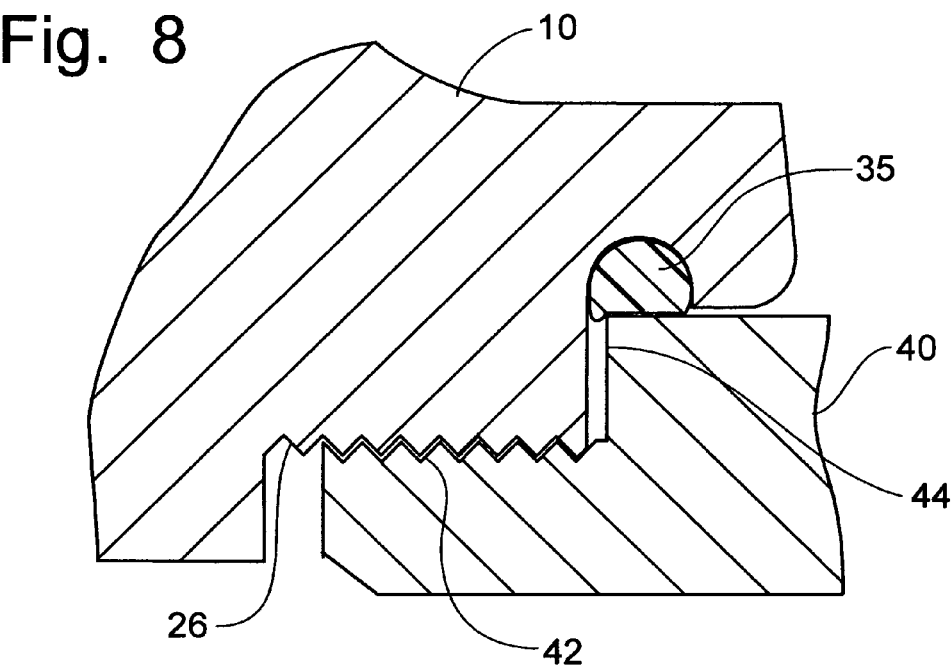
FIG. 8 is a cross-sectional view of the dust cap similar to that of FIG. 7, but depicting the full engagement of the dust cap into the wheel to compress the O-ring against the outer circumference of the dust cap.

The compression of the O-ring 35 against the shoulder 44 not only seals the dust cap 40 with respect to water and dirt, but places a restrictive load on the dust cap 40 to limit the rotation of the dust cap 40 for removal thereof from the wheel 10. Thus, when the dust cap 40 is installed, a wrench or socket is required to overcome the restrictive load imposed by the compressed O-ring 35 to affect the removal of the dust cap 40. As is depicted in FIG. 8, the shoulder 44 preferably serves to press the O-ring 35 back into the groove 30 so that the restrictive loading imposed by the compressed O-ring 35 is radial, as opposed to being longitudinal against the threads. The positioning of the shoulder 44 radially outwardly from the land 42, on which the threads are located, enables the threads on the land 42 to be engaged with the threads on the landing 26 without interference from the O-ring 35, thus enabling the dust cap 40 to be installed quickly. The O-ring 35 is not engaged until the dust cap 40 has been substantially threaded onto the wheel 10, as is depicted in FIG. 7.

In operation, the race car pulls into the pit during a race to require a wheel change. The pit crewperson applies an air-driven socket to the flats 45 on the closed end of the dust cap 40 and causes a rotation of the dust cap 40 against the restrictive loading imposed by the compressed O-ring 35 to disengage the dust cap 40 from the wheel 10. Then, without requiring a change in the size of the socket, the same air-driven socket is applied to the retainer nut 29 to affect a removal of the retainer nut 29 and the keeper 28 from the spindle 15. The entire wheel 10, rim 12 and tire 13 can be removed from the spindle 15 and a new one replaced. The keeper 28 and the retainer nut 29 are threaded back onto the spindle 15 and tightened by the air-driven socket. Then the dust cap is threaded onto the wheel 10 and tightened until the O-ring 35 seated in the groove 30 in the replacement wheel 10 is compressed back into the groove 30 to place a restrictive loading on the circumference of the dust cap 40.

This simple operation is designed to facilitate the rapid removal of the wheel 10 from the racing car while permitting the utilization of the dust cap to keep the bearings clear from water and dirt. Conventional dust caps that require the removal of separate fasteners, or a retaining clip, require a separate step utilizing a different tool than is used to affect the removal of the retainer nut 29, thus increasing the time required to affect a replacement of the tire 13 during a pit stop. Furthermore, the sealing of the dust cap 40 against the wheel 10 is affected immediately with the full installation of the dust cap 40 onto the wheel 10 without an additional step to ascertain the placement of a seal or other retaining apparatus.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A dust cap for use on an automotive wheel having an O-ring installed in a groove formed within the wheel, comprising:
   a cup-shaped member having a closed end and an open end adapted for engagement with said wheel;
   a circumferential land adjacent said open end and being formed with a first set of threads located on an external portion of said cup-shaped member, said first set of threads being engagable with a second set of threads formed on said wheel, said land having a smaller diameter than said groove to permit said first set of threads on said dust cap to engage said second set of threads on said wheel without interference from said O-ring mounted in said groove;
   a shoulder extending radially outwardly from the land to engage said O-ring supported on said wheel within said groove to engage an exterior surface of said cup-shaped member after said dust cap has been partially threaded onto the wheel, said shoulder causing said O-ring to be compressed when said dust cap is fully threaded into said wheel to affect a seal between said dust cap and said wheel and to impose a radial load on said exterior surface of said dust cap to restrict rotation of said dust cap relative to said wheel.

2. The dust cap of claim 1 wherein said closed end is formed with hexagonal flats for engagement with a tool to facilitate the rotation of said dust cap relative to said wheel.

3. The dust cap of claim 2 wherein said wheel is mounted onto a spindle and retained on said spindle by a retainer nut threaded onto said spindle, said retainer nut having hexagonal flats spaced substantially the same as said flats on said closed end of said dust cap so that the same tool can be used to affect removal of both said dust cap and said retainer nut.

4. The dust cap of claim 2 wherein said wheel is formed with a bore extending therethrough with a landing extending circumferentially around said bore and having threads formed thereon to correspond to said threads on said land of said dust cap, said groove being formed in said wheel around said bore, said groove having a greater diameter than said landing.

5. The dust cap of claim 4 wherein said shoulder compresses said O-ring into said groove such that said O-ring imposes a restrictive load exerted radially onto said dust cap to restrict rotation of said dust cap relative to said wheel.

6. A wheel for a racing car comprising:
   a shaped member having a central bore extending therethrough, said wheel having a landing extending circumferentially around said bore and being formed with a first set of threads, said wheel further including a groove extending circumferentially around said bore and having a greater diameter than said landing so as to be positioned radially outwardly from said landing;
   an O-ring mounted in said groove; and
   a dust cap formed as a cup-shaped member having a closed end and an open end, said dust cap including a land adjacent said open end and being formed with a second set of threads corresponding to said first set of threads on said wheel landing to permit engagement therebetween, said dust cap further being formed with a shoulder extending radially outwardly from said land so that said shoulder will engage and compress said O-ring when installed on said wheel, the positioning of said O-ring in said groove permitting said second set of threads on said dust cap to engage said first set of threads on said wheel without interference from said O-ring mounted in said groove.

7. The wheel of claim 6 wherein said shoulder compresses said O-ring into said groove such that said O-ring imposes a restrictive load exerted radially onto said dust cap to restrict rotation of said dust cap relative to said wheel.

8. The wheel of claim 7 wherein said closed end is formed with hexagonal flats for engagement with a tool to facilitate the rotation of said dust cap relative to said wheel.

9. The wheel of claim 8 wherein said wheel is mounted onto a spindle and retained on said spindle by a retainer nut threaded onto said spindle, said retainer nut having hexagonal flats spaced substantially the same as said flats on said closed end of said dust cap so that the same tool can be used to affect removal of both said dust cap and said retainer nut.

10. In a wheel for a racing car having a central bore extending therethrough and being retained on a spindle by a retainer nut having hexagonal flats for engagement with a tool for the removal of said retainer nut from said spindle to permit the removal of said wheel from said spindle the improvement comprising:

a dust cap threaded onto said wheel and engagable with an O-ring mounted in a groove formed in said wheel circumferentially around said central bore to affect a seal between said dust cap and said wheel, and to facilitate a rapid removal of said dust cap from said wheel, said O-ring placing a radial load onto an external surface of said dust cap when threaded onto said wheel to restrict movement of said dust cap relative to said wheel, said wheel being formed with a landing having a first set of threads formed thereon, said dust cap having a land formed around an open end of said dust cap, said land having a second set of threads thereon for engagement with said first set of threads, said groove having a greater diameter than said landing to permit said second set of threads on said dust cap to engage said first set of threads on said wheel without interference from said O-ring mounted in said groove.

11. The wheel of claim 10 wherein said dust cap is operable to compress said O-ring into said groove to place a restrictive load radially on said dust cap to restrict rotation thereof relative to said wheel.

12. The wheel of claim 11 wherein the compression of said O-ring into said groove affects a sealing of said dust cap against said wheel.

13. The wheel of claim 10 wherein said dust cap is also formed with a shoulder projecting radially outwardly from said land to engage said O-ring after said first and second set of threads have been at least partially engaged.

14. The wheel of claim 13 wherein said dust cap includes a closed end formed with hexagonal flats spaced substantially identically to said flats on said retainer nut so that the same tool can engage both said retainer nut and said closed end of said dust cap.

* * * * *